US008751524B2

(12) United States Patent
Futty et al.

(10) Patent No.: US 8,751,524 B2
(45) Date of Patent: Jun. 10, 2014

(54) APPLICATION STORE CONCIERGE

(75) Inventors: Joseph Futty, Sammamish, WA (US);
Miller T. Abel, Mercer Island, WA (US);
Eric P. Gilmore, Bothell, WA (US);
Kamran Rajabi Zargahi, Seattle, WA (US); John Clavin, Seattle, WA (US);
Viswanath Vadlamani, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 100 days.

(21) Appl. No.: 12/916,213

(22) Filed: Oct. 29, 2010

(65) Prior Publication Data

US 2012/0109999 A1 May 3, 2012

(51) Int. Cl.
*G06F 17/30* (2006.01)
(52) U.S. Cl.
USPC .................................. 707/769; 707/999.201
(58) Field of Classification Search
USPC ............... 704/9, 251, 257; 707/741, 999.101, 707/767, 769, 999.201, 999.203; 709/203
See application file for complete search history.

(56) References Cited

U.S. PATENT DOCUMENTS

| 7,606,700 | B2 * | 10/2009 | Ramsey et al. ............ 704/9 |
| 2007/0027931 | A1 | 2/2007 | Heckenbach |
| 2008/0214210 | A1 | 9/2008 | Rasanen et al. |
| 2008/0242274 | A1 | 10/2008 | Swanburg et al. |
| 2009/0239552 | A1 | 9/2009 | Churchill et al. |
| 2012/0084292 | A1 * | 4/2012 | Liang et al. .............. 707/741 |

OTHER PUBLICATIONS

Abbar, et al., "Context-Aware Recommender Systems: A Service-Oriented Approach", retrieved on Jul. 1, 2010 at <<http://persdb09.stanford.edu/proceedings/persdb-6.pdf>>, VLDB Endowment, Proceedings of International Workshop on Personalized Access, Profile Management and Context Awareness in Databases (PersDB) at Very Large Data Base Conference, Lyon, FR, Aug. 24, 2009, pp. 1-6.

Bai, et al., "FD/I-Based personalized recommendation in Context-aware Application", retrieved on Jul. 1, 2010 at <<http://ieeexplore.ieee.org/stamp/stamp.jsp?tp=&arnumber=4197353>>, IEEE Computer Society, International Conference on Multimedia and Ubiquitous Engineering (MUE), 2007, pp. 692-697.

Miluzzo, et al., "Evaluating the iPhone as a Mobile Platform for People-Centric Sensing Applications", retrieved on Jul. 1, 2010 at <<http://www.ists.dartmouth.edu/library/412.pdf>>, Proceedings of International Workshop on Urban, Community, and Social Applications of Networked Sensing Systems (UrbanSense), Raleigh, NC, Nov. 4, 2008, pp. 41-45.

Panagos, et al., "Actionable User Intentions for Real-Time Mobile Assistant Applications", retrieved on Jul. 1, 2010 at <<http://sunsite.informatik.rwth-aachen.de/Publications/CEUR-WS/Vol-478/paper3.pdf>>, John Wiley and Sons, The Fabric of Mobile Services, 2009, pp. 1-5.

(Continued)

*Primary Examiner* — Marc Filipczyk
(74) *Attorney, Agent, or Firm* — Holly Nguyen; Carole Boelitz; Micky Minhas

(57) ABSTRACT

An application sequence may be composed in response to a user query. The application sequence may be based upon user data accessed by the application concierge service. Each application within the personalized chain of applications may request and receive data from the application concierge service about the other applications within the chain.

20 Claims, 7 Drawing Sheets

(56) References Cited

OTHER PUBLICATIONS

Wang, et al., "Recommendations Based on Semantically-enriched Museum Collections", retrieved on Jul. 1, 2010 at <<http://www.chip-project.org/presentation/Wangetal-jws.pdf>>, Elsevier Science Publishers—Amsterdam, Web Semantics: Science, Services and Agents on the World Wide Web, vol. 6, No. 4, Nov. 2008, pp. 283-290.

Webster, Scott "Amazon throws hat into Android app store ring" retrived on Oct. 1, 2010 at http://www.cnet.com/8301-19736_1-20018078-251.html, CNet, Sep. 29, 2010, 2 pages.

* cited by examiner

APPLICATION STORE CONCIERGE

Application stores enable eligible users to access applications presented by the Application store. The application store provides a "one stop shop" for users searching for applications ranging anywhere from media applications to applications providing stock market services. Application stores allow users to search the available applications using a keyword search or using a free form text search to find a desired application.

To satisfy a user query, an application store typically returns multiple applications to the user as search results. The applications returned in the search results may or may not be able to perform functions desired by the user. In many instances, the apps returned in the search results will only perform part of the functionality desired by the user. In that case, the user may have to search for and install multiple different applications in order to perform a desired function, requiring the user to install and enter personal information multiple times into the multiple applications. Each application may also require the user to enter information received from a first application into a second application, a third application, and/or a fourth application. This can be time consuming, frustrating for the user, and may also introduce errors.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

This disclosure describes composing one or more proposed application sequences in response to a user query.

In an exemplary implementation, an application concierge service is utilized in a search environment. The application concierge service composes a personalized chain of applications in response to a user query that may be utilized by a user to perform a task. The personalized chain of applications may be composed based upon user data accessed by the application concierge service. For example, the application concierge service may have access to user data including personal information (e.g., email, phone number, list of applications, calendar, and application usage information), social information (e.g., list of contacts, favorites, friends, and the like), and secure information (e.g., bank account information, credit card information, social security information, and the like). This access enables the application concierge service to present the user with a best fit scenario composed of multiple applications to perform a desired task in response to the user query. In some instances, each application within the personalized chain of applications may request and receive data from the application concierge service about the other applications within the chain to facilitate completion of the task without requiring the user to re-enter information multiple times into multiple applications.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

When users perform a search, they are often trying to perform a task or are looking for an answer to a question. A response to a user query may require the use of several applications to perform the task or answer the question. For example, to plan a night out, the user may need to access a map, a movie application, and a restaurant application. Using multiple applications in response to a user search may present many obstacles. For example, the user may not have one or more of the needed applications installed on his or her device. Even if the user has the needed applications installed, the applications may be unaware of each other, and therefore are not privy to any information the user may have provided any of the other applications. This may result in the user supplying the same or similar information to several applications. This is both frustrating and time consuming for the user.

A method and process to compose a customized application sequence in response to a user query is described. More specifically, an exemplary process constructs a chain of applications in response to a user query based upon user data, supplemental data, and previously defined application chains. The application concierge store service enables the chain of applications to be customized to the user and provide the applications information without requiring further user input.

Exemplary Environment

Figure 1:
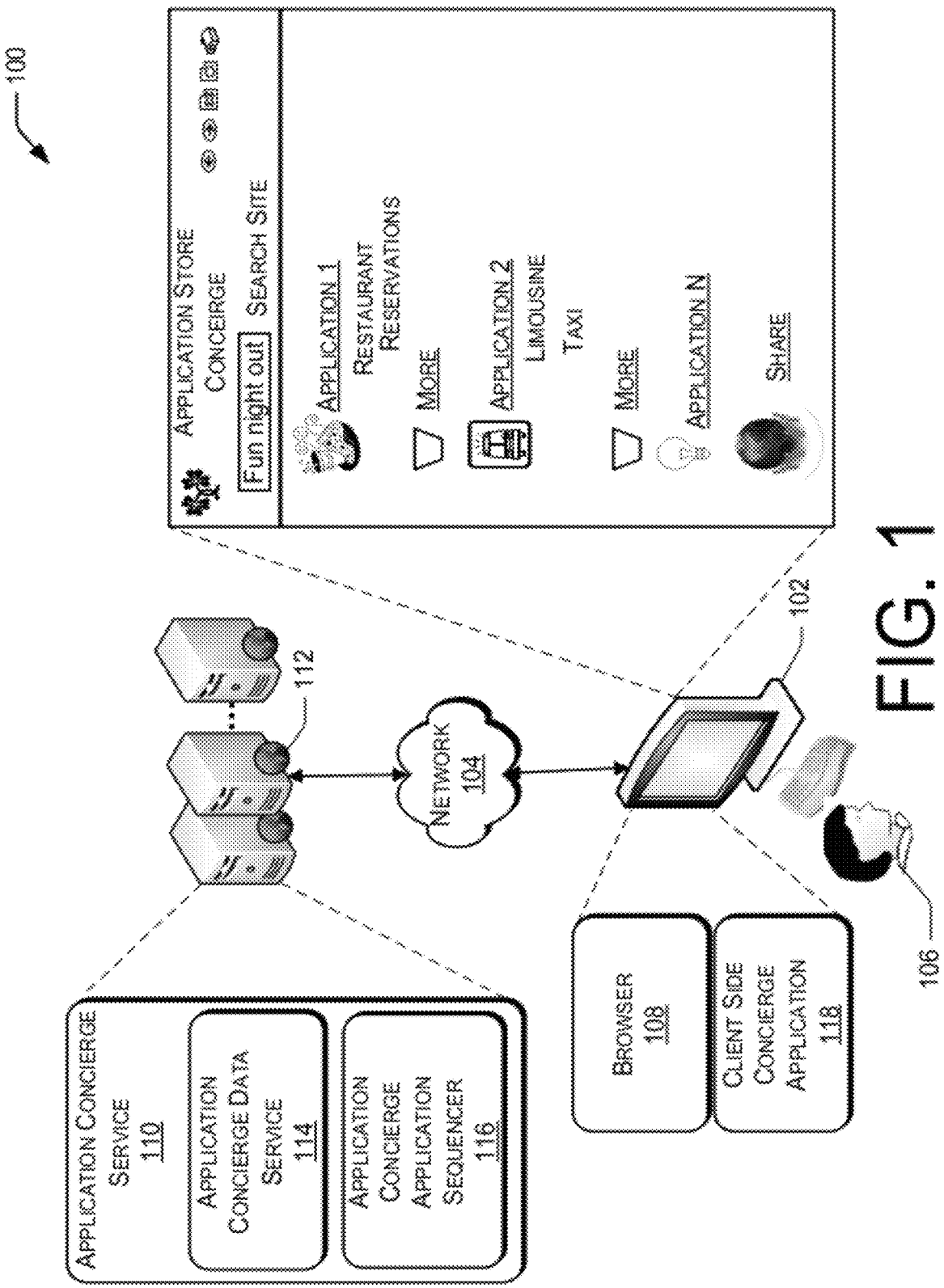
FIG. 1 is a schematic of an illustrative environment for the application store concierge service.

FIG. 1 is a block diagram of an exemplary environment 100, which is used for an application store concierge service. The environment 100 includes an exemplary computing device 102, which may take a variety of forms including, but not limited to, a portable handheld computing device (e.g., a personal digital assistant, a smart phone, a cellular phone), a laptop computer, a desktop computer, a tablet computer, a netbook, a media player, a digital camcorder, an audio recorder, a camera, or any other similar device.

The computing device 102 may connect to one or more networks(s) 104 and is associated with a user 106. The computing device 102, as described herein, may be implemented in various types of systems or networks. For example, the computing device may be a stand-alone system, or may be a part of, without limitation, a client-server system, a peer-to-peer computer network, a distributed network, a local area network, a wide area network, a virtual private network, a storage area network, and the like.

The network(s) 104 represent any type of communications network(s), including, but not limited to, wire-based networks and/or wireless networks.

The computing device 102 enables the user 106 to operate a browser 108 or other client application to interact with an application concierge service 110 on server(s) 112. For instance, the user 106 may launch the browser 108 to navigate to the application concierge service 110 and input a search term or search terms, constituting a user query, into the application concierge service 110. The user query may be in a natural language and is sent over network(s) 104 to server(s) 112. The user input is received through any of a variety of user input devices, including, but not limited to, a keyboard, a mouse, a touch screen, a stylus, or a microphone.

In some instances, the application concierge service may be a part of an application store, such as the Windows Mobile® application store, iTunes® application store, or Android® marketplace. In other instances, the application concierge service 110 may be a separate stand alone service. In either instance the application concierge service 110 may itself have a client side concierge application 118 installed on the computing device 102 to facilitate interaction with the application concierge service 110. Alternatively, the application concierge service 110 may be accessed via the browser without the need for a client side concierge application.

The application concierge service 110 (also referred herein as "the service") may include, without limitation, an application data service 114 and an application concierge application sequencer 116. The application data service 114 includes an application store comprising numerous applications to perform any number of tasks in response to the user query. For example, if the user 106 requests a "night out on the town," the application data service may include applications pertaining to restaurants, entertainment, transportation, and the like. The application concierge application sequencer 116 combines one or more applications in a workflow determined to be the best chain of applications to respond to the user query. In other words, the determined workflow comprises a step by step execution of a process to satisfy the user query. For example, using the same request "a night out on the town," the application concierge data service 114 may retrieve a restaurant application, an entertainment application, and a transportation application. The application concierge application sequencer 116 links the retrieved applications such that the user is presented with the restaurant application, the entertainment application, and the transportation application in a workflow the application concierge service 110 determines to be the most useful to the user 106. In one implementation, the results are displayed to the user 106 in a results page. In another implementation, the user 106 is immediately directed to a first application of the chain.

Figure 2:
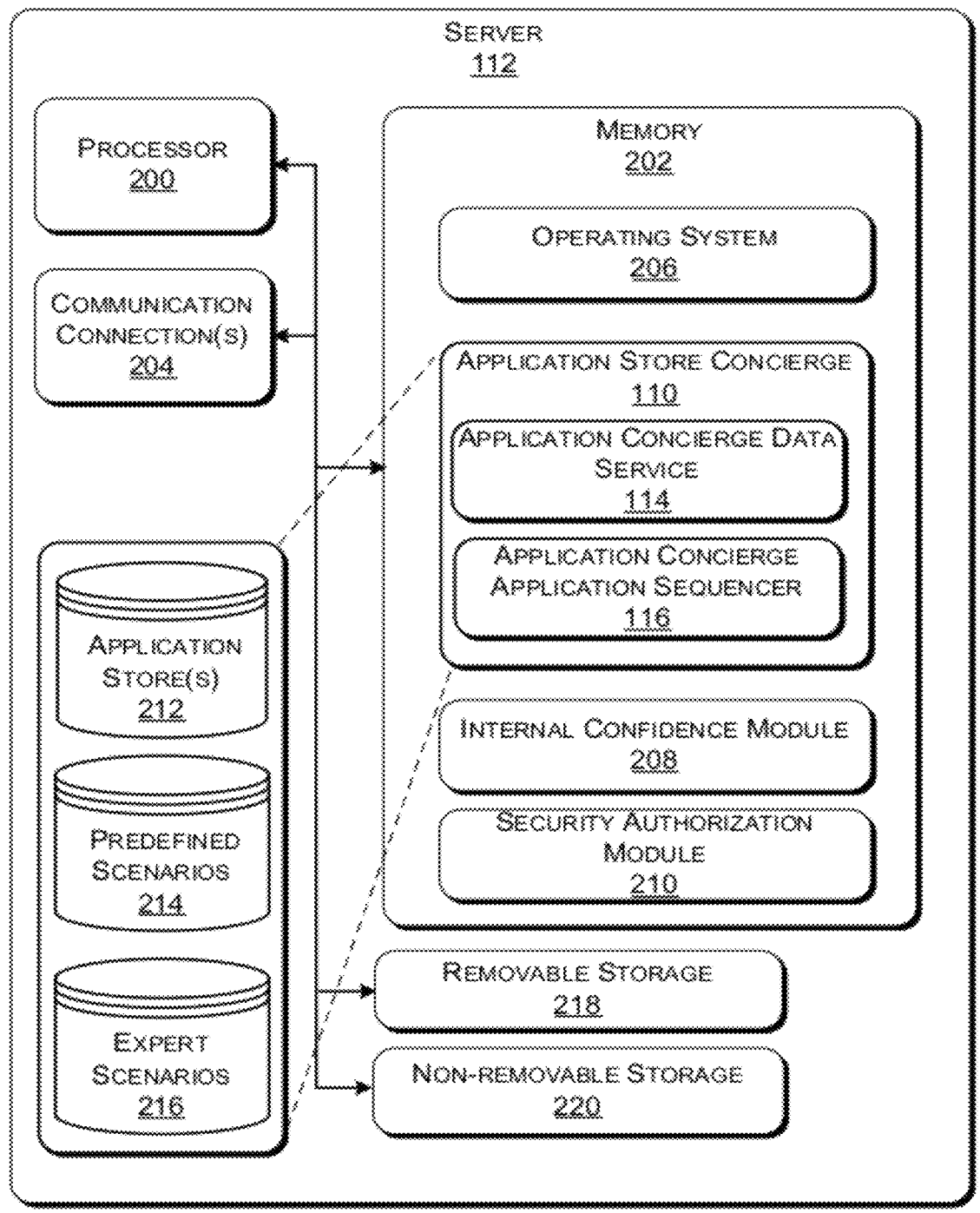
FIG. 2 is a block diagram of an exemplary server within the application store concierge environment of FIG. 1.

FIG. 2 illustrates an exemplary server 112. The server 112 may be configured as any suitable system capable of providing the application concierge services. In one exemplary configuration, the server 112 comprises at least one processor 200, a memory 202, and communication connection(s) 204. The communication connection(s) 204 may include access to a wide area network (WAN) module, a local area network module (e.g., WiFi), a personal area network module (e.g., Bluetooth), an Ethernet connection, a USB connection, and/or any other suitable communication modules to allow the web server 112 to communicate over the network(s) 104.

Turning to the contents of the memory 202 in more detail, the memory 202 may store an operating system 206, the application store concierge 110, the application concierge data service 114, the application concierge application sequencer 116, an internal confidence module 208, and a security authorization module 210. The internal confidence module 208 is an internal scoring mechanism used by the application concierge service 110 to determine the confidence level in a scenario returned to the user. For example, if the scenario satisfies or is higher than a preset scoring value, the application concierge service 110 may direct the user 106 directly to an Application of the scenario. The authorization module 210 retains secure data associated with the user 106. The secure data may be used by a chain of applications, or by a specific application, to complete a transaction desired by the user 106. The secure data may be encrypted and/or may require a security credential (e.g., password, biometric scan, or the like), to access. The user 106 may be given the option to opt out of sharing personal and/or secure information with the application concierge 110.

Memory 202 is an example of computer-readable storage media. Computer-readable storage media includes, but is not limited to, volatile and non-volatile, removable and non-removable media implemented in any method or technology for storage of information such as computer-readable instructions, data structures, program modules or other data. In some examples, computer-readable media comprises non-transitory, tangible media. Additional types of computer-readable storage media that may be present include, but are not limited to, phase change memory (PRAM), SRAM, DRAM, other types of RAM, ROM, electrically erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the application concierge service 110 and the computing device 102, respectively. Combinations of any of the above should also be included within the scope of computer-readable storage media.

While the application store concierge 110 is shown to be a component within the server 112, it is to be appreciated that the application store concierge 110 may alternatively be, without limitation, a component within the computing device 102 and/or a standalone component. In one implementation, the application concierge data service 114 has access to, without limitation, one or more application stores 212, a predefined application scenario list 214, and an expert application scenario list 216. The application store 212 may include one or more applications available to the user in response to a query. The predefined application scenario list 214 may include, without limitation, a list of predefined scenarios, where a scenario includes a collection of applications linked together in a predetermined order. An expert scenario may be a pre-established scenario list, similar to that of the predefined application scenario list, established by an expert in a particular field. Alternatively, the application concierge data service 114 may supply an expert application with customization factors to provide an expert scenario.

The server 112 may also include additional removable storage 218 and/or non-removable storage 220. Any memory described herein may include volatile memory (such as RAM), nonvolatile memory, removable memory, and/or non-removable memory, implemented in any method or technology for storage of information, such as computer-readable instructions, data structures, applications, program modules, emails, and/or other content. Also, any of the processors described herein may include onboard memory in addition to or instead of the memory shown in the figures. The memory may include storage media such as, but not limited to, random access memory (RAM), read only memory (ROM), flash memory, optical storage, magnetic disk storage or other magnetic storage devices, or any other medium which can be used to store the desired information and which can be accessed by the respective systems and devices.

The server as described above may be implemented in various types of systems or networks. For example, the server may be part of, including but is not limited to, a data center, a server form, a client-server system, a peer-to-peer computer network, a distributed network, an enterprise architecture, a local area network, a wide area network, a virtual private network, a storage area network, and the like. For example, in one implementation, the server 112 may be associated with a web search engine such as Microsoft's Bing®.

Various instructions, methods, techniques, applications, and modules described herein may be implemented as computer-executable instructions that are executable by one or more computers, servers, or computing devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various implementations. An implementation of these modules and techniques may be stored on or transmitted across some form of computer-readable media.

Exemplary Application Concierge Service

Figure 3:
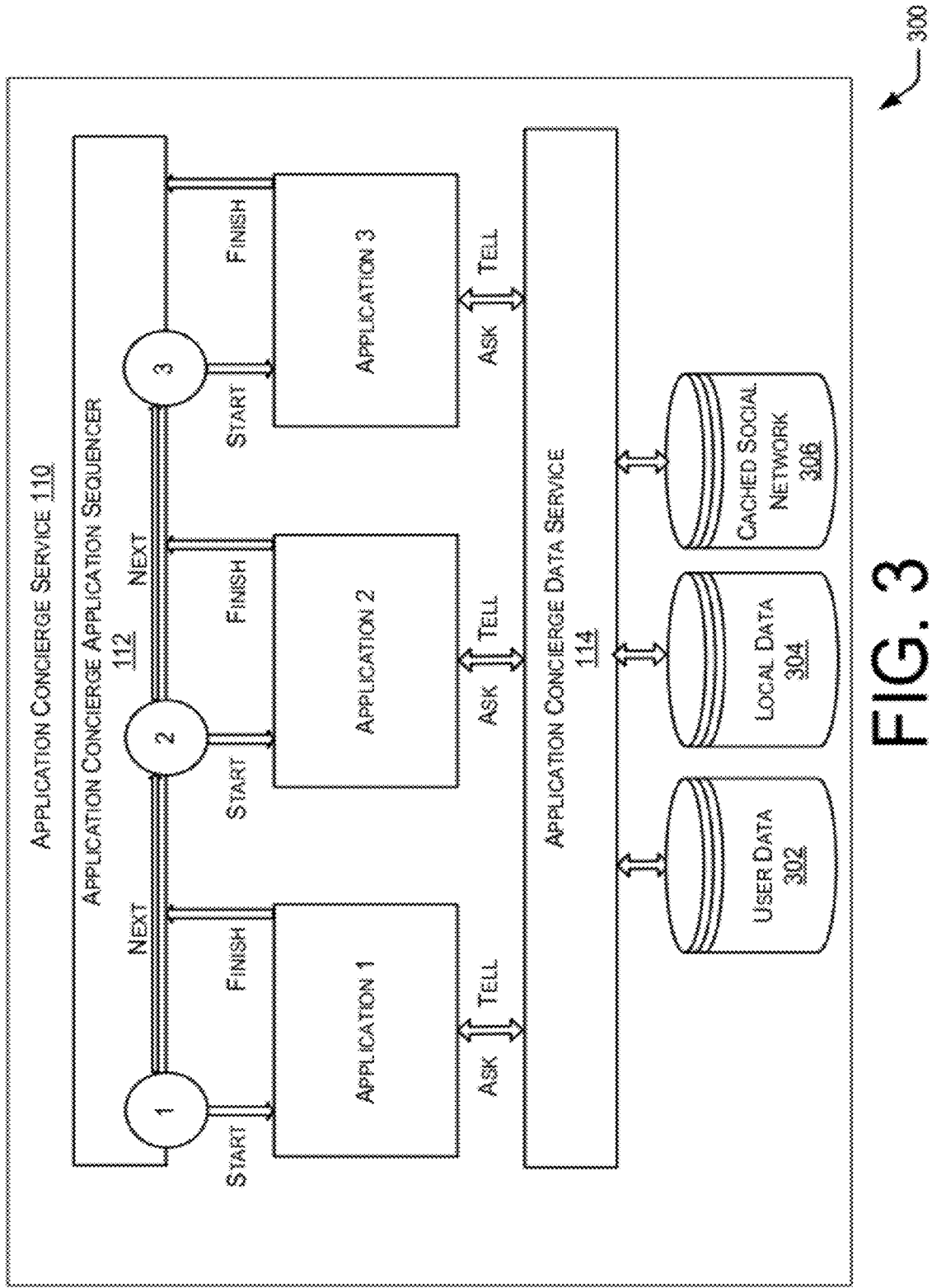
FIG. 3 is an illustrative application sequencing process within the application store concierge environment of FIG. 1.

FIG. 3 illustrates a sequencing process 300 enabling the application concierge service 110 to customize a response to the user query. The customized response may include selecting one or more applications based upon user preferences and linking selected applications in a coordinated manner. The process 300 further enables one application to request and receive information from several sources, as well as supply information from one application to another application.

As illustrated in FIG. 3, a response to the user query may include several applications, for example, as shown in FIG. 3, Application 1, Application 2, and Application 3. The sequence of the applications displayed in FIG. 4 may be determined by one or a combination of databases. For example, as discussed above with respect to FIG. 2, the application concierge data service 114 has access to one or more application stores 212, the predefined application scenario list 214, and the expert application scenario list 216 via the application concierge service 110. Further, the concierge service may supply information (e.g., personal or secure information) to one or more applications in the chain.

A predefined application scenario list 214 may include, without limitation, a list of predefined scenarios, where a scenario includes a collection of applications linked together in a predetermined order. The predetermined order may have been established by the application concierge service 110, by the applications themselves, by the user, and/or by other users. For example, the applications may be designed specifically with other applications in mind. An independent software vendor (ISV) may upload an application to the concierge application data service 114. The application may include a microdata format (or any other suitable format to describe the service and application program interface (API)), giving the concierge application data service context about what this particular application can do and how the application behaves (e.g., inputs and outputs). Such a design enables one application to be aware of another application, therefore enabling multiple applications to be linked together in response to a user query. The ISV may also include within the microdata format multiple parameters enabling the applications to be customized to the user 106. For example, without limitation, a display color, a display layout, or a font size.

In another implementation, the concierge application data service may access the expert application scenario list 216. In some instances, an expert scenario may be pre-established by an expert in a particular field. For example, if the user 106 inputs a query "taking a trip to Rome this summer," the application concierge data service 114 may access the expert scenario application list to find a predefined application combination including applications directed to air travel, the best hotels in Rome, local restaurants, transportation, etc. according to one or more experts in the field. In other instances, the application concierge data service 114 may prepare a scenario list giving preference to applications that provide an expert's view on a particular subject (e.g., an insider's view of bed and breakfasts in the Pacific Northwest, or a travel application with expert tips and recommendations for business travelers). Thus, a scenario may be an "expert scenario" because the scenario is pre-established by an expert and/or because the applications making up the scenario provide expert tips or recommendations.

In either of the foregoing instance, the application concierge data service 114 may access an expert scenario application to construct the expert scenario application list 216 supplied to the user 106. Alternatively, the application concierge data service may simply adjust its criteria for recommending application scenarios based on user input requesting an expert scenario. To construct such an application list, the application concierge data service may supply user specific details or prompt the user 106 for additional details regarding specific travel plans to provide a customized expert application scenario list. In one implementation, the application concierge data service 114 may have access to user data 302, local data 304, and a cached social network 306. Utilizing this data, the application concierge data service 114 may determine that the user 106 has previously established that direct flights are preferable over non direct flights. In addition, the user data 302 may include hobbies and locations that the user 106 enjoys visiting. The application concierge data service may supply this information to the expert application and in response, the expert application may recommend applications directed to airlines/flights, sites to see and things to do, such as tourist destinations, restaurants, and or shops consistent with those preferences. Alternatively, as noted above, the user's preference for expert recommendations may simply be one piece of the user data 302. In that case, the application concierge data service 114 may simply alter the rules it uses to generate the application scenarios to favor scenarios recommended by experts and/or applications that provide expert analysis. After constructing the expert scenario application list 216, the expert application may return the list to the user via the application concierge data service 114. The user 106 may then access the applications included within the expert scenario application list using the functions and features provided by the application store concierge 110 and described herein.

The expert application scenario list may also include color commentary associated with particular recommendations. For example, the expert scenario may include an application and commentary directed to a particular hotel in Rome. The commentary may include, without limitation, the price range of the hotel, amenities offered by the hotel, proximity of the hotel to desirable landmarks, and the like. This commentary may include interactive prompts to solicit additional preference information from the user. Examples of such additional information in the context of planning a trip include the purpose of the trip (business vs. pleasure, relaxation vs. adventure, family vacation vs. romantic getaway, etc.), the importance of various factors (e.g., convenience vs. rating, amenities vs. proximity to a certain location, etc.), or other information that may be useful in customizing the trip to the user's preferences. This additional preference information may also be used to train the application concierge data service 114 to provide the user with more relevant application scenarios in the future.

As discussed above, the user 106 may be asked for permission to share particular data with the application concierge service 110 and/or may be allowed to opt out of the sharing of the information at any time. Moreover, the user 106 may be allowed to grant access to some data (e.g., location), but not others (e.g., social network data). The user data 302 may include, without limitation, user information, such as user preferences, the user's 106 calendar, and the user's 106 previous application scenario choices installed on the computing device 102, and/or application usage data. Utilizing the user data 302, the application concierge data service 114 may access the one or more application stores 212, the predefined list of scenario 214, and/or the expert scenario list 216 to present the user with a combination of applications linked together to best fit the user 106.

In addition, the application concierge data service 114 may also access local data 304 and the cached social network 306 when determining the best combination of applications to present to the user in response to a user query. The local data 304 may include weather, traffic, etc., corresponding to the geographical location associated with the user query. The cached social network 306 includes, without limitation, a connection to the user's contacts and/or social network. The social network may provide the application concierge data service 114 information relating to preferences and schedules of the user's network, further enabling the application concierge data service 114 to determine the most appropriate applications to link and present to the user 106 in response to the query.

To utilize the social network 306, the user 106 may be required to grant access to the application concierge service 110. After granting access, the application concierge service 110 will be able to use information, such as preferences and feedback of the friends of the user 106, when determining the composition of applications.

The application concierge application sequencer 112 positions and links the applications retrieved by the application in a sequence to respond to the user query. For example, Application 1 is positioned first in the application sequence, followed by Application 2, and Application 3. The application concierge application sequencer 112 may automatically initiate Application 1 or may prompt the user 106 to initiate the application chain. If the Application 1 requires additional information, Application 1 may ask the application concierge data service 114. For example, if Application 1 needs to access the user's 106 calendar, the Application 1 may "ask" the application concierge data service 114. If this level of permission has been granted, the application concierge data service 114 may access the user data 306 to retrieve the user's calendar. The application concierge data service 114 may then tell (or output) the calendar information to Application 1. Alternatively, if the user has not previously granted the application concierge data service 114 access to this information, the user 106 may be prompted to do so. After Application 1 is complete, the application concierge application sequencer 112 may progress to launch Application 2, followed by Application 3.

In one implementation, Application 1 may also provide information or data to Application 2 directly or via the application concierge service 110, thereby reducing the need for user interaction. For example, if Application 1 requests and receives the user's calendar, the application concierge service 110 may transmit the information from Application 1 to Application 2, providing Application 2 with information already supplied to Application 1, thereby alleviating the need for Application 2 to request duplicate information from the application concierge data service 114 or the user 106. In some instances Application 1 may not be terminated prior to launching Application 2 and/or Application 3. In other words, the applications may run in parallel enabling, without limitation, the application concierge service 110 to simultaneously search one or more aspects of the user query and/or perform multiple portions of a task simultaneously.

The application concierge service 110 may also access the internal confidence module 208. The internal confidence module assists in the process of mapping applications to a user query. The more information that the application concierge service 110 has about the user 106 and the user's preferences, the more confident the application concierge service is in the results returned to the user. For example, if the applications linked together to respond to a user query satisfies or is higher than a preset scoring value, the application concierge service 110 may direct the user 106 directly to Application 1. However, if the score is lower than the preset scoring value, the results may be presented to the user 106 in a results page similar to that of FIG. 6, discussed below.

In one implementation, the confidence level may increase the more user utilizes the application data service 110. For example, when the user first uses the application data service 110, the service may have very little knowledge about the user. Therefore, application scenarios recommended to the user may not be exactly what the user was looking for. However, the more user 106 utilizes the application data service, the more information that the service may have access to, enabling the service to make a more educated recommendation of applications to the user. For example, the application data service may learn more as the user modifies suggested application chains and as the user chooses from among suggested application chains.

Figure 4:
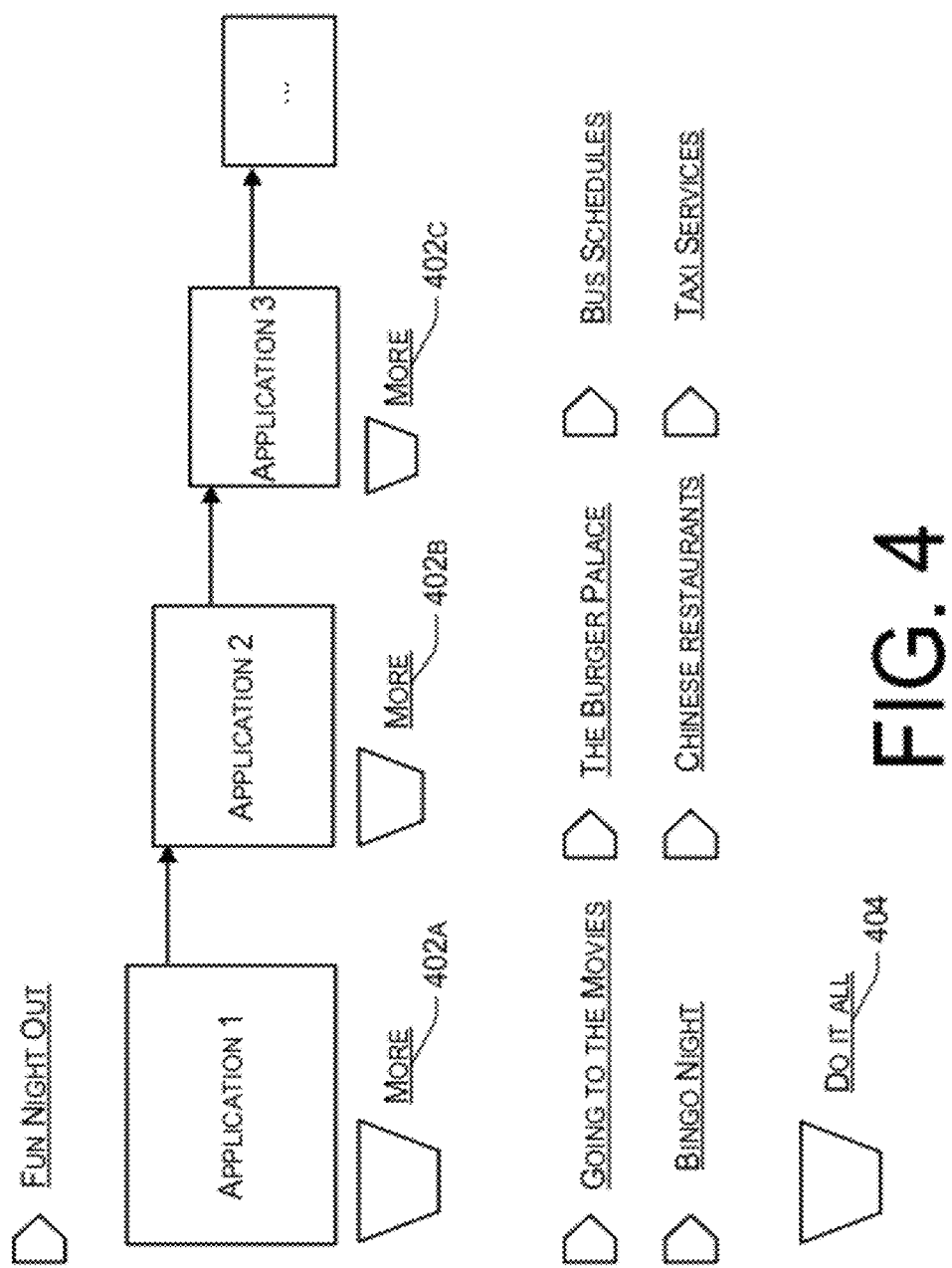
FIG. 4 is an exemplary application scenario for an application chain within the application concierge environment of FIG. 1.

FIG. 4 illustrates an exemplary results page presented to the user 106. As shown in FIG. 4, the user query is "fun night out." The application concierge service 110 receives the request and returns to the user Application 1, Application 2, and Application 3. Each of the applications contains results corresponding to the user query "fun night out." For example, Application 1 includes entertainment options, such as, going to the movies or bingo night. Application 2 may include restaurants. The restaurants may, without limitation, be specific restaurants or they may be categories, for example, Chinese or Italian. Application 3 may include transportation options. For example, bus schedules or taxi information. If there are no options displayed that satisfy the user 106, the user may override the concierge application service 110. For example, the user 106 may select the more option 402a, 402b, or 402c. The more option may include, without limitation, additional choices for the user such as Application 1', Application 2', or Application 3'. In addition, there may be a "do it all for me" option 404, selection of which indicates that the user 106 would like for the application concierge service 110 to make all of the decisions, arrangements, and or reservations necessary to satisfy the user query.

Figure 5:
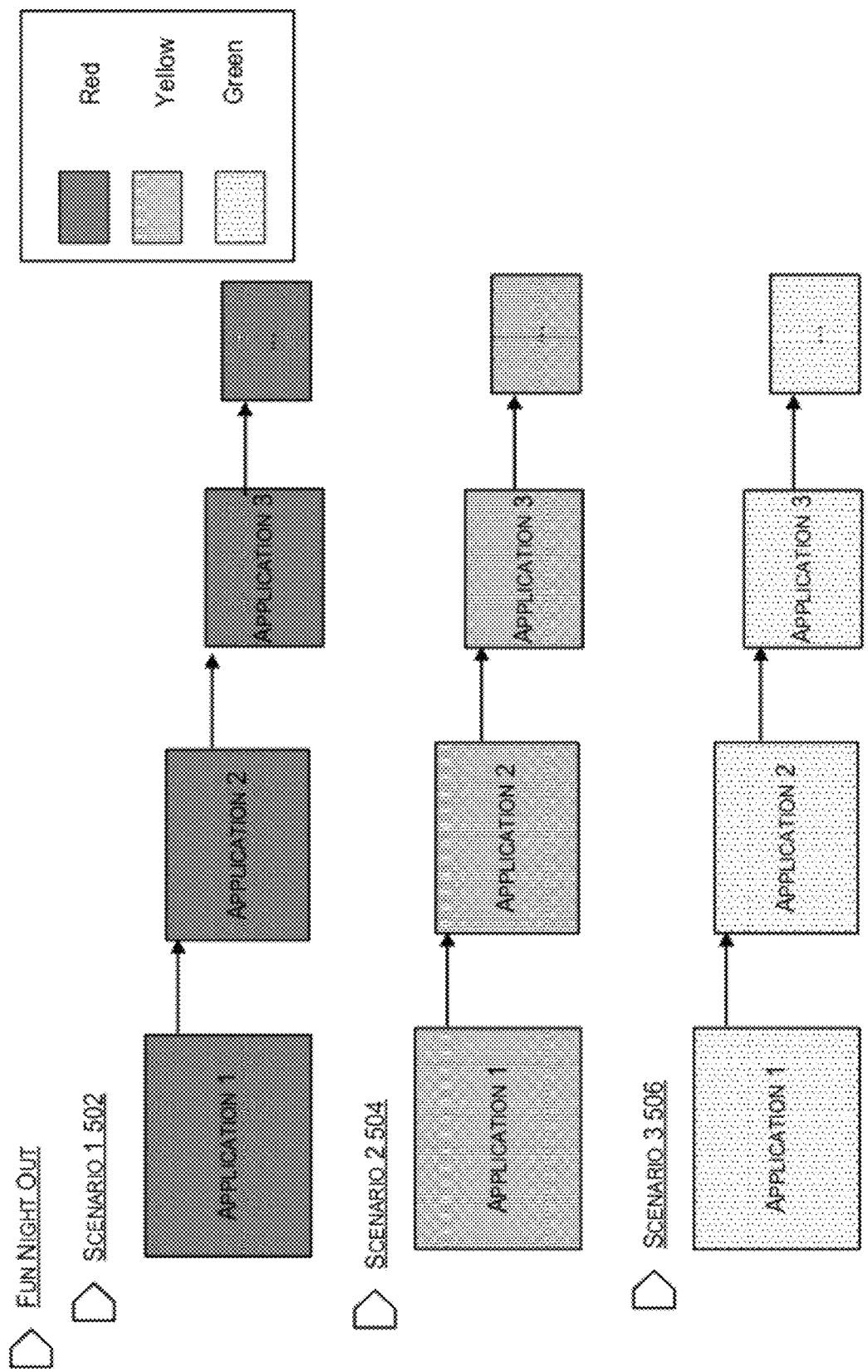
FIG. 5 is illustrative of an exemplary authorization scheme within the application store concierge environment of FIG. 1.

As illustrated in FIG. 5, a scenario may require sensitive information, such as banking or credit card information, to complete transactions within the application. For example, in one implementation, the results page presented to the user may indicate the level of personal information required by the combination of applications. A scenario 1 502 may require highly sensitive information and is therefore highlighted in red. A scenario, such as scenario 2 504 and scenario 3 506, require less sensitive information and are therefore highlighted in yellow and green, respectively. A scenario in green requires little to no personal information, while a yellow scenario requires somewhere in the middle of red and green. It is to be appreciated however, that any number of levels and or indicators may be used.

The security authorization module 210 may be used by the application concierge service 110 to determine whether they have immediate and unrestricted access to secure personal information. To make this determination, the security authorization module 210 may track and retain the use of such personal information throughout the lifetime of the relationship between the user 106 and the application concierge service 110. For example, the first time user 106 is presented with a chain of applications requiring sensitive information, such as scenario 1, the application concierge service 110 may request permission from the user 106 prior to divulging personal information. For example, if the user 106 would like to purchase movie tickets through Application 1, the user would have to supply some sort of payment information, such as credit card information or bank account information, and allow the application concierge service 110 to use the payment information to purchase the tickets.

Following the first use, the user 106 may trust the concierge service and give the application concierge service 110 permission to use this information in dealings with future applications that require it. The security authorization module 210 may document this exchange for future access by the application concierge service 110.

The amount of trust may be ascertained, without limitation, using a two-fold determination. First, the amount of trust may be determined by an extent to which the user 106 has used the application concierge service 110. The more the user 106 uses the application concierge service, the more trust develops between the user and the service. Second, the application concierge service 110 may also have determined a level of trust with particular applications. For example, a level of trust may be established when an application is repeatedly utilized by the user 106 or the user consistently chooses applications by a particular publisher, creating a level of trust with that particular publisher. The higher level of trust instilled in the application concierge service 110, may enable the service to release the sensitive information without further authorization from the user 106.

Another implementation may allow the user 106 to specify to the security authorization module 210 what types of information that the application concierge service may share with Applications without prompting the user 106 for permission. For example, the user 106 may authorize the application concierge service 110 to share with the applications, calendar information or social contact information, but require further permission to release banking and/or credit card information. In another implementation, the individual applications may have permission to directly access the user information that a particular application may require to proceed. For example, the user 106 may have previously indicated that the security authorization module 210 has permission to share information with Application 1, or applications similar to Application 1.

Figure 6:
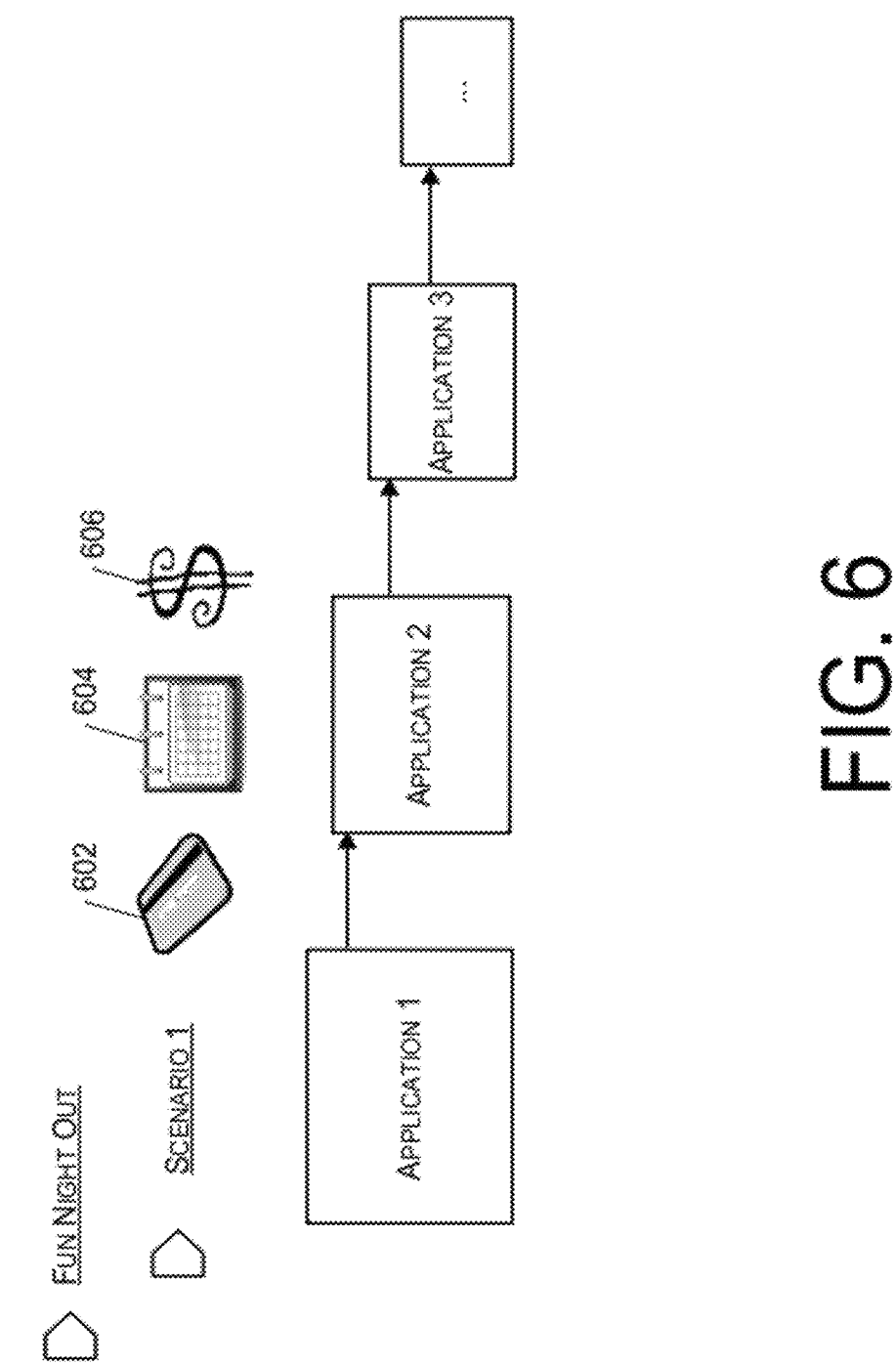
FIG. 6 is illustrative of an alternative authorization scheme within the application store concierge environment of FIG. 1.

In another implementation, the results page may include visual indicators representative of the information required by the application combination of the scenario. For example, as illustrated in FIG. 6, visual indicators may include, without limitation, credit card information 602, calendar information 604, and banking information 606.

Exemplary Process

Figure 7:
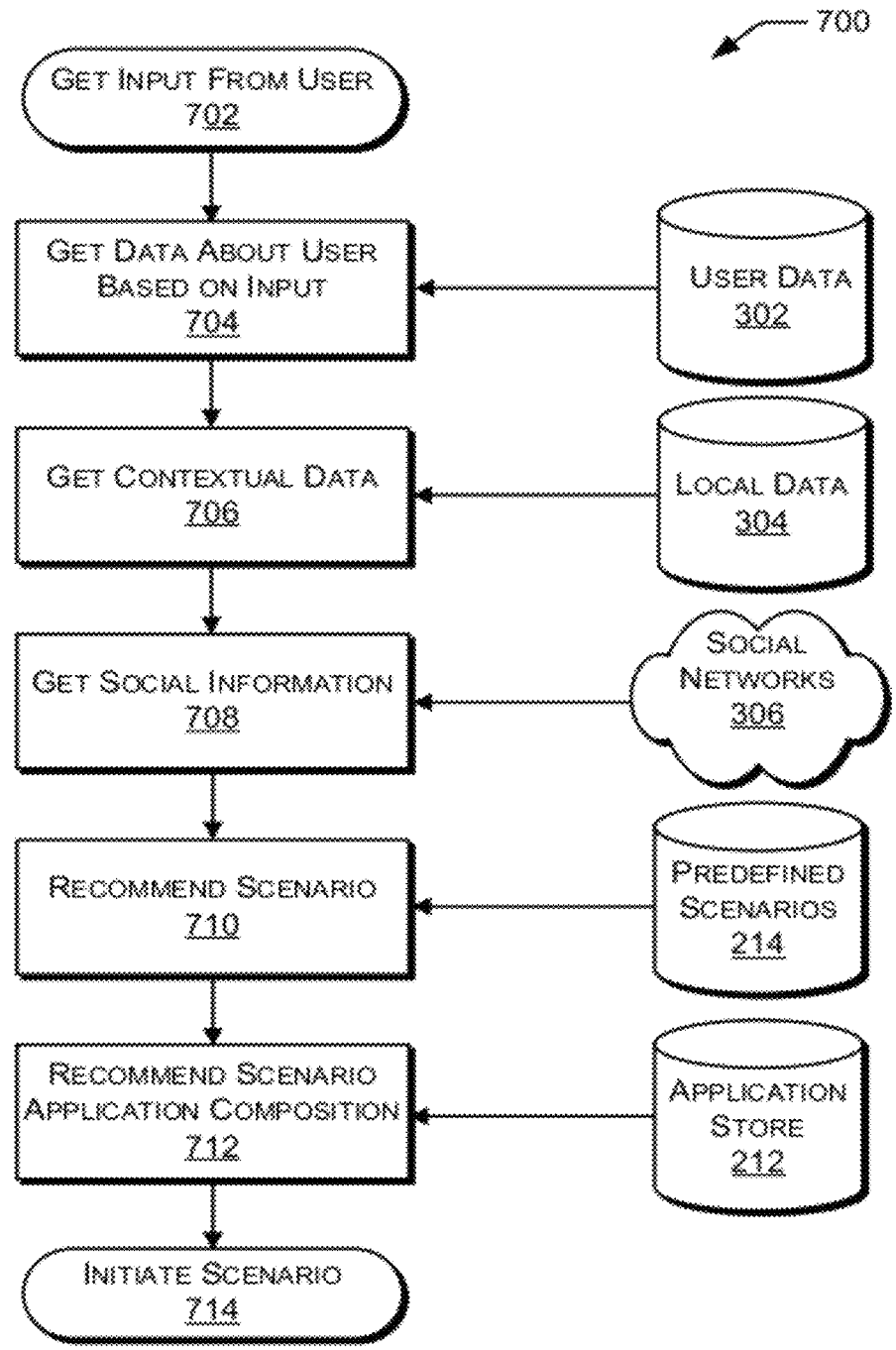
FIG. 7 is a flow chart of an exemplary use outlining an application composition within the adaptation environment of FIG. 1.

FIG. 7 illustrates a flow diagram of an example process 700 outlining the application concierge service according to some implementations herein. In the flow diagram, the operations are summarized in individual blocks. The operations may be performed in hardware, or as processor-executable instructions (software or firmware) that may be executed by one or more processors. Further, the process 700 may, but need not necessarily, be implemented using the framework of FIG. 1.

At block 702, input from the user 106 is received by the application concierge service 110. In some implementations, the input is in a natural language text format. However, in other implementations, the input may be in any suitable format usable by the application concierge service 110, for example, without limitation, structured text queries, voice input, or the like.

At block 704, the application concierge data service 114 retrieves information associated with the user 106. In one implementation, the user data is maintained within the user data 302. The user data may include, without limitation, such as user preferences, the user's 106 calendar, and the user's 106 previous application scenario choices installed on the computing device 102, and/or application usage data. In other implementations, data about the user may be maintained by the application concierge data service 114.

At block 706, supplemental data may be supplied to the application concierge data service 114. The supplemental data may include, without limitation, a location, a date, a time zone the user 106 is currently located in, a weather report, traffic conditions, and the like.

At block 708, the application concierge data service 114 may also acquire data related to the user's 106 social network 306. For example, services enjoyed by the user's friends may also be of interest to the user 106. Therefore, the application concierge data service 114 may have access to the user's social network to obtain the user's friends' previously used services as well as any feedback provided by the user's friends about those services.

At block 710, the application concierge data service 114 may recommend a service scenario in response to the user's input (or user query). The scenario list may be based upon any one of, or a combination of, a predefined scenario list 214, an expert derived list 216, a list of applications based upon feedback from previous use by the user 106, and/or access to the user's social network to obtain the user's friends previously used services as well as any feedback provided by the user's friends about those services.

At block 712 the application concierge application sequencer 116 may recommend and present to the user 106 a scenario comprising a list of multiple applications.

At block 714, the scenario is initiated with application 1. In one implementation, to fully process the scenario, one or more of the applications may require additional and/or supplemental information. For example, without limitation, if the first application is a movie ticket application, the first application may receive as input data what the start time for a particular movie may be. The first application may then output that movie start time to application two. If application 2 is a restaurant application, the restaurant application may then schedule reservations for dinner according to the movie output time.

CONCLUSION

Although an indication process to compose a customized application sequence in response to a user query is has been described in language specific to structural features and/or methods, it is to be understood that the subject of the appended claims are not necessarily limited to the specific features or methods described. Rather, the specific features and methods are disclosed as exemplary implementations.

What is claimed is:

1. A computer-implemented method comprising:
receiving a query from a user requesting identification of a plurality of software applications for use by the user to perform a task identified in the query;
referencing user data relevant to the task identified in the query;
responsive to the user query, automatically identifying, by searching one or more application stores, an application sequence comprising a plurality of software applications that each perform separate portions of the task such that the application sequence enables the user to perform the entire task, the identifying based at least in part on the task, application programming interface (API) descriptions of inputs and outputs for each of the plurality of software applications, and the user data, wherein features and behavior of the plurality of software applications in the one or more application stores are described in descriptive data that is associated with the plurality of software applications;
combining, by a processor, the plurality of software applications in a workflow in which each software application of the plurality of software applications occupies a sequential position and at least one of the plurality of software applications provides data to an immediately subsequent software application in the workflow; and
determining a confidence score indicating a likelihood that the workflow performs the task identified in the query, the determining based at least in part on a history of user actions relevant to the task.

2. The computer-implemented method of claim 1, wherein the at least one of the plurality of software applications provides the data directly to the immediately subsequent software application in the workflow.

3. The computer-implemented method of claim 1, further comprising:
receiving, from the user, permission to share the user data with one or more of the plurality of software applications; and
providing the user data to one or more of the plurality of software applications.

4. The computer-implemented method of claim 1, further comprising:
determining that the confidence score meets a confidence score level; and
automatically launching, by the concierge application, a first software application in the workflow, in response to determining that the confidence score meets the confidence score level.

5. The computer-implemented method of claim 1, further comprising:
determining that the confidence score does not meet a confidence score level; and
presenting, to the user, a results page comprising a list of software applications in the workflow showing sequential positions of the software applications, in response to determining that the confidence score does not meet the confidence score level.

6. The computer-implemented method of claim 1, wherein the user data comprises at least one of a calendar, location data, contacts, application usage data, bank account information, or credit card information.

7. A system comprising:
a memory;
one or more processors coupled to the memory; and
a software application concierge service operable by the one or more processors, the software application concierge service comprising:
an application data service configured to automatically identify a plurality of software applications from an application store that each perform separate portions of a task such that the plurality of software applications enables a user to perform an entirety of the task based at least in part on the task, application programming interface (API) descriptions of inputs and outputs for each of the plurality of software applications, and user data relevant to the task, wherein the task is identified in a query from the user, and wherein features and behavior of the plurality of applications in the application store are described in descriptive data that is associated with the plurality of applications;
a sequencer configured to generate a workflow in which each of the plurality of software applications occupies a sequential position and at least one of the plurality of software applications provides data to an immediately subsequent software application in the workflow; and
a confidence module configured to determine a confidence score indicating a likelihood that the workflow performs the task identified in the query based at least in part on a history of user actions relevant to the task.

8. The system of claim 7, wherein the sequencer is further configured to:
automatically launch a first software application in the workflow; and
automatically launch a second software following termination of the first software application, wherein the second software application occupies a position in the workflow immediately subsequent to the first software application.

9. The system of claim 7, wherein the application data service is further configured to provide the user data to a first software application in the workflow.

10. The system of claim 9, wherein the application data service is further configured to transfer the user data from the first software application to a second software application via the application data service, wherein the second software application occupies a position in the workflow immediately subsequent to the first software application.

11. The system of claim 7, further comprising a security module configured to determine whether the software application concierge service is authorized to access secure user data.

12. The system of claim 11, wherein the security module is further configured to provide the secure user data to at least one of the plurality of software applications, in response to determining that the software application concierge service is authorized to access the secure user data.

13. The system of claim 11, wherein the software application concierge service is further configured to request permission from the user to access the secure user data each time the secure user data is requested by one or more of the plurality of software applications, in response to the security module determining that the software application concierge service is not authorized to access the secure user data.

14. The system of claim 11, wherein the secure user data comprises at least one of a calendar or payment information.

15. The system of claim 7, wherein the confidence module is further configured to automatically launch a software application that occupies a first sequential position in the workflow in response to determining that the confidence score is greater than or equal to a preset score.

16. One or more computer instruction storages accessible by a computing device, the computer instruction storages storing computer-executable instructions which, when executed by one or more processors, cause the one or more processors to perform operations comprising:
receiving a query from a user requesting identification of a plurality of software applications for use by the user to perform a task identified in the query;
referencing user data relevant to the task;
responsive to the user query, automatically identifying, by searching one or more application stores, an application sequence comprising the plurality of software applications that each perform separate portions of the task such that the application sequence enables the user to perform an entirety of the task, the identifying based at least in part on the task, application programming interface (API) descriptions of inputs and outputs for each of the plurality of software applications, and the user data, wherein features and behavior of the plurality of software applications in the one or more application stores are described in descriptive data that is associated with the plurality of software applications;
combining the plurality of software applications in a workflow in which each software application occupies a sequential position and at least one of the plurality of software applications provides data to an immediately subsequent software application in the workflow; and
determining a confidence score indicating a likelihood that the workflow performs the task identified in the query, the determining based at least in part on a history of user actions relevant to the task.

17. The one or more computer instruction storages accessible by a computing device of claim 16, wherein the at least one of the plurality of software applications provides the data directly to the immediately subsequent software application in the workflow.

18. The one or more computer instruction storages accessible by a computing device of claim 16, wherein the user data comprises at least one of a calendar, location data, contacts, application usage data, bank account information, or credit card information.

19. The one or more computer instruction storages accessible by a computing device of claim 16, further comprising automatically launching a software application that occupies a first sequential position in the workflow in response to determining that the confidence score is greater than or equal to a preset score.

20. The one or more computer instruction storages accessible by a computing device of claim 16, further comprising presenting a results page comprising a list of software applications in the workflow showing sequential positions of the software applications to the user in response to determining that the confidence score is less than a preset score level.

* * * * *